No. 872,131. PATENTED NOV. 26, 1907.
C. JOHNSON.
CHANGE SPEED GEARING.
APPLICATION FILED MAY 3, 1907.
2 SHEETS—SHEET 1.
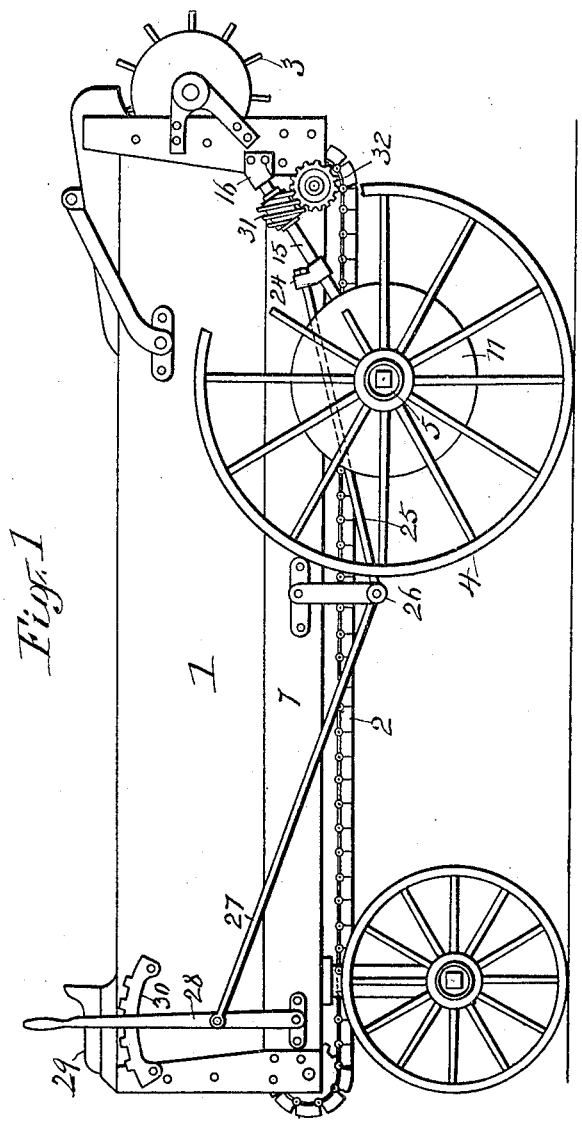
WITNESSES:
Chas H Hughes.
J. J. Laass
INVENTOR
Charles Johnson
By E. Laass
ATTORNEY.

No. 872,131. PATENTED NOV. 26, 1907.
C. JOHNSON.
CHANGE SPEED GEARING.
APPLICATION FILED MAY 3, 1907.
2 SHEETS—SHEET 2.
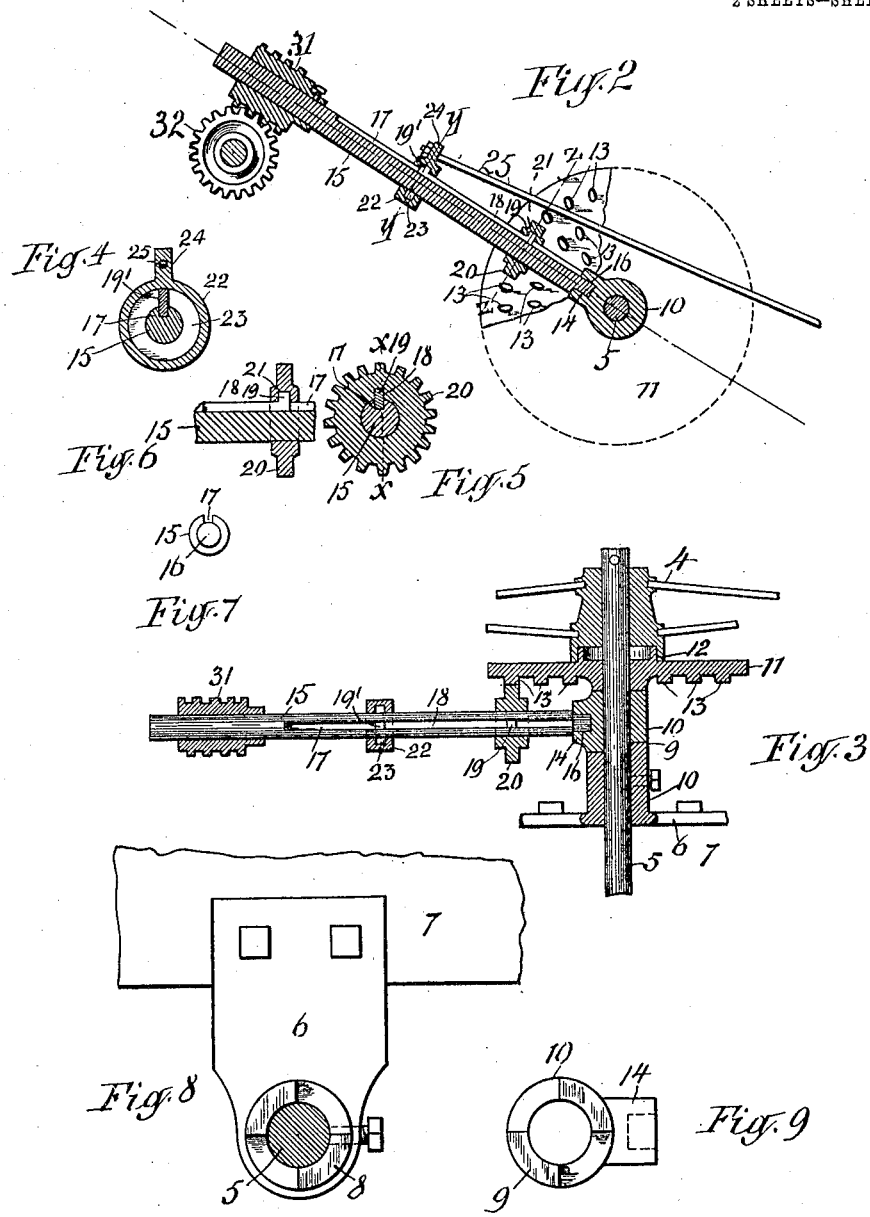
WITNESSES:
Chas. H. Hughes
J. J. Laass
INVENTOR
Charles Johnson
By E. Laass
ATTORNEY.

UNITED STATES PATENT OFFICE.

CHARLES JOHNSON, OF AUBURN, NEW YORK, ASSIGNOR OF ONE-HALF TO CHARLES FRANK, OF NEWARK VALLEY, NEW YORK.

CHANGE-SPEED GEARING.

No. 872,131.   Specification of Letters Patent.   Patented Nov. 26, 1907.

Application filed May 3, 1907, Serial No. 371,577.

*To all whom it may concern:*

Be it known that I, CHARLES JOHNSON, a citizen of the United States, and resident of Auburn, in the county of Cayuga, in the State of New York, have invented new and useful Improvements in Change-Speed Gearing, of which the following, taken in connection with the accompanying drawings, is a full, clear, and exact description.

This invention has special reference to the mechanisms employed for transmitting motion to the longitudinally movable apron which constitutes the bottom of the vehicle-body of the manure spreading machine.

Machines of the aforesaid class are operated upon the ground of a field, and are mounted on vehicle wheels by which they travel on the road in moving to and from the field and in consequence thereof, the mechanisms of said machines are liable to become clogged by dust and mud gathering thereon in their operation and aforesaid travel.

The object of this invention is to shield the connections of the change-speed gearing which transmits motion from one of the traction-wheels to the longitudinally movable apron which forms the bottom of the manure-spreading machine. And to that end the invention consists in the improved connection of the pinion and shifting collar to the longitudinally movable spline of the shaft on which said pinion and collar are mounted as hereinafter described.

In the accompanying drawings Figure 1 is a side elevation of a manure spreading machine embodying my present improvements; Fig. 2 is a vertical longitudinal section of the shaft and its equipment for transmitting motion to the apron of the aforesaid machine; Fig. 3 is a plan view of the aforesaid shaft with the coöperating parts shown in section; Fig. 4 is an enlarged transverse section on the line —Y—Y— in Fig. 2; Fig. 5 is an enlarged transverse section on the line —Z—Z— in Fig. 2; Fig. 6 is a longitudinal sectional view on the line —X—X— in Fig. 5; Fig. 7 is an end view of the aforesaid shaft; Fig. 8 is a side view of one of the brackets which support the rear end of the vehicle-body on the axle of the traction-wheels; and Fig. 9 is an inner side view of the collar which locks the axle on the body of the vehicle and is formed with the axial bearing for the aforesaid shaft.

—1— denotes the box or body of the vehicle to which the manure-spreading mechanisms are connected. —2— represents the longitudinally movable apron which constitutes the bottom of the aforesaid body and serves to carry the manure to the rear end of the body, where the manure is to be distributed upon the ground.

—3— denotes the usual beater which is arranged over the rear end of the apron for the purpose of effectually scattering and spreading the manure in its delivery onto the ground.

—4— represents one of the traction-wheels which are journaled on the hind-axle —5— fastened in brackets —6— which are rigidly attached to the side sills —7— of the body —1— as shown in Fig. 8. The outer side of the bracket —6— is formed with an annular clutch-face —8— surrounding the axle —5— and interlocking with a similar clutch-face —9— on the inner end of a collar —10— mounted on the aforesaid axle.

—11— represents a disk which is mounted loosely on the axle —5— between the collar —10— and the hub of the traction-wheel —4— as shown in Fig. 3 of the drawings. By means of suitable interlocking clutch members (indicated at —12— in Fig. 3), the disk —11— receives rotary motion from the traction-wheel.

The inner face of the disk —11— has projecting from it a plurality of concentric rows of gear-teeth —13— as shown in Figs. 2 and 3.

The collar —10— is formed with a socket —14— in which is journaled the front end of a shaft —15—, the opposite end is journaled in a bracket —16— which is rigidly attached to the side of the rear end of the body —1— as shown in Fig. 1. Said shaft is thus confined in its alinement. The journal of the front end of the shaft —15— is reduced circumferentially corresponding to the socket —14— as shown at —16—. The main portion of the shaft —15—, from the reduced portion —16— rearward is provided with a longitudinal groove —17— in which is seated a longitudinally movable spline —18— formed with outwardly projecting teeth —19— and —19¹— respectively on opposite ends thereof. The front end of the groove —17— is cleared by the reduced end portion or journal —16— of the shaft and thus the said groove is easily formed in the shaft.

—20— denotes a pinion mounted on the shaft —15— movably lengthwise thereof and adapted to engage the gear-teeth —13— of one of the concentric rows at a time. The axial bearing of the said pinion is formed with an internal socket —21— into which the front tooth —19— of the spline —18— is inserted and thus anchors the pinion to the spline, as shown in Fig. 6. By the aforesaid arrangement of the socket —21— in the interior of the pinion only the single tooth —19— is required to effect the anchoring of the pinion on the spline.

—22— represents a collar which loosely embraces the shaft —15— so as to prevent the said collar from receiving rotary motion and is formed with a circumferential groove —23— in the center of its inner side. Said collar is connected to the spline —18— by the rear tooth —19¹— engaging the groove —23— in which said tooth is allowed to travel during the rotation of the shaft —15—. The sides of the collar are intact to completely embrace the shaft and shield the tooth —19¹— in the interior of the collar. By shifting the collar —22— longitudinally on the shaft the spline —18— is caused to move the pinion —20— correspondingly from one row of gear-teeth —13— to another row of said teeth and thus change the speed of rotation of the shaft —15— as may be desired. The spline —18— connecting the pinion —20— to the shiftable collar —22— in thus made to serve the purposes of transmitting motion to the shaft —15— and regulating said motion.

The collar —22— is prevented from rotating as aforesaid and is formed with a radially projecting lug —24— to which is suitably connected the rear end of a longitudinally movable and laterally restrained rod —25—, the front end of which is connected to the lower end of a pendent lever —26— pivoted to the side of the body —1— as shown in Fig. 1. Another rod —27— is connected at its rear end to the lower end of the pendent lever —26— and has its front end connected to a hand-lever —28— pivoted to the side of the body —1— in proximity to the driver's seat —29—, the occupant of which operates the lever —28— to shift the collar —22— and thereby move the pinion —20— to a position to engage the necessary row of gear-teeth —13— to impart the desired speed to the shaft —15—. The hand-lever —28— is provided with the usual dog (not shown) to engage a rack —30— attached to the side of the body —1—.

—31— represents a worm attached to the shaft —15— near the rear end thereof and engaging a worm-gear —32— attached to the shaft of the wheels which carry the apron —2— at the rear end of the body —1—. Said apron thus receives its motion from the shaft —15—.

What I claim as my invention is:—

In combination with the rotary disk provided with a plurality of concentric rows of gear-teeth, a shaft extending radially from the axis of said disk and provided with a longitudinal groove, a longitudinally movable spline in said groove and formed with a tooth on each end, and a longitudinally movable speed-changing rod restrained from lateral movement, a pinion mounted loosely on said shaft and connected to the tooth on the front end of the spline, a collar loosely embracing the shaft and formed with a circumferential groove in the center of its interior and engaging the tooth on the rear end of the spline, with a lug projecting from the exterior of said collar and connected to the aforesaid speed changing rod as set forth.

CHARLES JOHNSON. [L. s.]

Witnesses:
WILLIAM HAWLEY,
SIDNEY S. WILLS.